United States Patent
Ishikura et al.

(10) Patent No.: US 12,196,698 B2
(45) Date of Patent: Jan. 14, 2025

(54) METAL OXIDE SEMICONDUCTOR GAS SENSOR

(71) Applicant: TDK CORPORATION, Tokyo (JP)

(72) Inventors: Tomokazu Ishikura, Tokyo (JP); Kazutaka Fujita, Tokyo (JP); Raitaro Masaoka, Tokyo (JP)

(73) Assignee: TDK CORPORATION, Tokyo (JP)

( * ) Notice: Subject to any disclaimer, the term of this patent is extended or adjusted under 35 U.S.C. 154(b) by 287 days.

(21) Appl. No.: 17/984,758

(22) Filed: Nov. 10, 2022

(65) Prior Publication Data

US 2024/0159700 A1   May 16, 2024

(51) Int. Cl.
*G01N 27/12* (2006.01)

(52) U.S. Cl.
CPC .................. *G01N 27/125* (2013.01)

(58) Field of Classification Search
CPC ..... G01N 27/12; G01N 27/125; G01N 27/127
See application file for complete search history.

(56) References Cited

U.S. PATENT DOCUMENTS

| | | | | |
|---|---|---|---|---|
| 5,298,783 A | * | 3/1994 | Wu | G01N 27/12 204/418 |
| 5,621,162 A | * | 4/1997 | Yun | G01N 27/125 73/31.06 |

FOREIGN PATENT DOCUMENTS

| | | |
|---|---|---|
| JP | 3676194 B2 | 7/2005 |
| JP | 6128598 B2 | 5/2017 |

* cited by examiner

*Primary Examiner* — Benjamin R Schmitt
(74) *Attorney, Agent, or Firm* — Oliff PLC

(57) ABSTRACT

A metal oxide semiconductor gas sensor includes a first electrode, a second electrode, and a sensing layer in contact with the first electrode and the second electrode. The sensing layer includes $SnO_2$ and $WO_3$. A cross section of the sensing layer has an average porosity of 16.0% or more and 22.0% or less. $SnO_2$ occupies 60 vol % or more and 80 vol % or less and $WO_3$ occupies 20 vol % or more and 40 vol % or less in the sensing layer provided that pores are not counted as part of the sensing layer.

4 Claims, 3 Drawing Sheets

METAL OXIDE SEMICONDUCTOR GAS SENSOR

TECHNICAL FIELD

The present invention relates to a metal oxide semiconductor gas sensor.

BACKGROUND

Nitric oxide (NO) causes environmental harm in various ways as an air pollutant. Thus, the concentration of NO has been measured with a gas sensor. A solid electrolyte type gas sensor including zirconia or so is used when the concentration of NO in a gas of interest is 1 ppm to several hundred ppm. In recent years, a metal oxide semiconductor gas sensor has been drawing attention for having a small and simple structure.

Patent Document 1 discloses a metal oxide semiconductor gas sensor having a NO sensing layer including $Co_3O_4$ supporting at least one metal.

Patent Document 2 discloses a thin film nitrogen oxide gas sensor having a two-layer structure including a $WO_3$ layer on top and a low resistance layer (e.g., a $SnO_2$ layer) with a lower resistivity than $WO_3$ at the bottom.

Patent Document 1: JP Patent No. 6128598
Patent Document 2: JP Patent No. 3676194

SUMMARY

It is an object of an exemplary embodiment of the present invention to provide a metal oxide semiconductor gas sensor capable of detecting nitric oxide (NO) at a concentration of 1 ppm or less in a gas of interest at low cost.

To achieve the above object, a metal oxide semiconductor gas sensor according to an exemplary embodiment of the present invention includes a first electrode, a second electrode, and a sensing layer in contact with the first electrode and the second electrode, wherein the sensing layer includes $SnO_2$ and $WO_3$, a cross section of the sensing layer has an average porosity of 16.0% or more and 22.0% or less, and $SnO_2$ occupies 60 vol % or more and 80 vol % or less and $WO_3$ occupies 20 vol % or more and 40 vol % or less in the sensing layer provided that pores are not counted as part of the sensing layer.

$\varphi_f - \varphi_n \geq 1.0$ may be satisfied, in which $\varphi_f$(%) is the average porosity of a region of the sensing layer closest to the first electrode and the second electrode, and $\varphi_n$(%) is the average porosity of a region of the sensing layer farthest from the first electrode and the second electrode, provided that the sensing layer is divided into three substantially equal regions in a thickness direction of the sensing layer.

A cross section of the sensing layer may have an average pore size of 70 nm or more and 150 nm or less.

The sensing layer may have a thickness of 1.0 μm or more.

BRIEF DESCRIPTION OF THE DRAWING(S)

DETAILED DESCRIPTION

Figure 1:
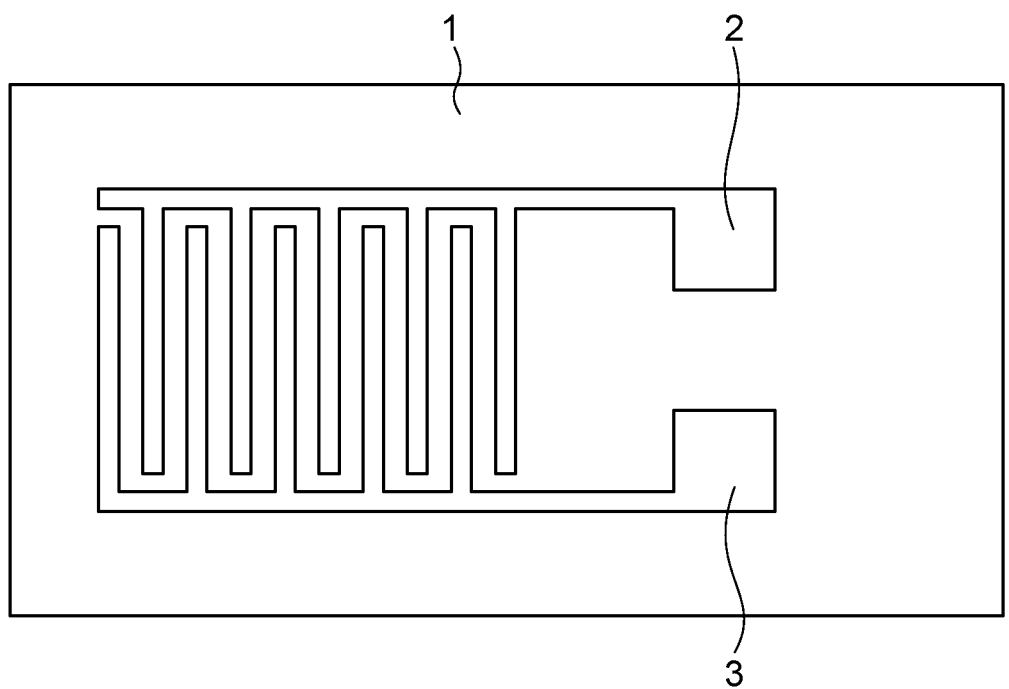
FIG. 1 is a diagram of a metal oxide semiconductor gas sensor according to an embodiment of the present invention before a sensing layer is formed.

Hereinafter, a metal oxide semiconductor gas sensor 10 according to an embodiment of the present invention will be explained with reference to FIGS. 1 to 3.

The metal oxide semiconductor gas sensor 10 includes a substrate 1, a first electrode 2 formed on the substrate 1, a second electrode 3 formed on the substrate 1, and a sensing layer 4 in contact with both the first electrode 2 and the second electrode 3. The sensing layer 4 is formed on a surface of the substrate 1 having the first electrode 2 and the second electrode 3.

The sensing layer 4 includes pores so as to have an average porosity of 16.0% or more and 22.0% or less in addition to a metal oxide material. The average porosity may be measured by any method. For example, the ratio of the total area of the pores in at least one cross section of the sensing layer 4 to the area of the at least one cross section as a whole may be regarded as the average porosity. The at least one cross section may be observed by any method that enables the metal oxide material and the pores to be distinguished. For example, a SEM or an optical microscope may be used.

The at least one cross section of the sensing layer 4 may be determined by any method that enables the average porosity of the sensing layer 4 to be appropriately measured. For example, the ratio of the total area of the pores in one cross section of the sensing layer 4 parallel to its thickness direction to the area of the cross section may be calculated.

The sensing layer 4 includes $SnO_2$ and $WO_3$. $SnO_2$ occupies 60 vol % or more and 80 vol % or less and $WO_3$ occupies 20 vol % or more and 40 vol % or less in the sensing layer 4 provided that the pores are not counted as part of the sensing layer 4.

The proportion of $SnO_2$ in the sensing layer 4 provided that the pores are not counted as part of the sensing layer 4 indicates the proportion of $SnO_2$ in the metal oxide material of the sensing layer 4. The proportion of $WO_3$ in the sensing layer 4 provided that the pores are not counted as part of the sensing layer 4 indicates the proportion of $WO_3$ in the metal oxide material of the sensing layer 4. Note that the first electrode 2 and the second electrode 3 are not included in the sensing layer 4.

The proportion of $SnO_2$ and the proportion of $WO_3$ may be measured by any method. For example, LA-ISP-MS may be used for measurement.

The predetermined ranges of the average porosity and the proportion of each component of the sensing layer 4 allow the metal oxide semiconductor gas sensor to be highly sensitive to NO and responsive.

The sensing layer 4 may have an average pore size of 70 nm or more and 150 nm or less. The average pore size may be measured by any method. For example, the equivalent circular diameters of the pores, or the diameters of circles having the same areas as the pores, in a cross section of the sensing layer 4 parallel to its thickness direction may be calculated to work out their average.

The mean free path of NO changes in accordance with the average pore size. The above-mentioned range of the average pore size allows the metal oxide semiconductor gas sensor to readily be more highly sensitive to NO and more responsive.

Provided that the sensing layer 4 is divided into three substantially equal regions in its thickness direction, $\varphi_f - \varphi_n \geq 1.0$ may be satisfied, where $\varphi_n$(%) is the average porosity of a region closest to the first electrode 2 and the second electrode 3, and $\varphi_f$(%) is the average porosity of a region farthest from the first electrode 2 and the second electrode 3. In other words, in the sensing layer 4, a part thereof with which a gas of interest is to be mainly in contact and its vicinity may have a high average porosity. Satisfaction of $\varphi_f - \varphi_n \geq 1.0$ allows the metal oxide semiconductor gas sensor to readily be more highly sensitive to NO and more responsive.

Values of $\varphi_n$ and $\varphi_f$ may be measured by any method. For example, an image acquired with a SEM or the like by observing a cross section of the sensing layer 4 parallel to its thickness direction where the first electrode 2 and the second electrode 3 are not included may be divided into three substantially equal sections in the thickness direction. The proportion of the total area of the pores in the section corresponding to the region closest to the first electrode 2 and the second electrode 3 may be $\varphi_n$. The proportion of the total area of the pores in the section corresponding to the region farthest from the first electrode 2 and the second electrode 3 may be $\varphi_f$.

In the region closest to the first electrode 2 and the second electrode 3, $SnO_2$ may occupy 60 vol % or more and 80 vol % or less and $WO_3$ may occupy 20 vol % or more and 40 vol % or less provided that the pores are not counted as part of the region. In the region farthest from the first electrode 2 and the second electrode 3. $SnO_2$ may occupy 60 vol % or more and 80 vol % or less and $WO_3$ may occupy 20 vol % or more and 40 vol % or less provided that the pores are not counted as part of the region. In any region that is included in the sensing layer 4 and occupies one third or more of its volume. $SnO_2$ may occupy 60 vol % or more and 80 vol % or less and $WO_3$ may occupy 20 vol % or more and 40 vol % or less provided that the pores are not counted as part of the region.

The sensing layer 4 may include other metal oxides and/or $SiO_2$ as long as the sensitivity to NO and the responsivity are not significantly affected. Examples of the other metal oxides include $TiO_2$. The other metal oxides and $SiO_2$ may occupy 10 vol % or less in the sensing layer 4 provided that the pores are not counted as part of the sensing layer 4.

The sensing layer 4 may include components other than the metal oxides and $SiO_2$ as long as the sensitivity to NO and the responsivity are not significantly affected. The components other than the metal oxides and $SiO_2$ may occupy 5 vol % or less in the sensing layer 4 provided that the pores are not counted as part of the sensing layer 4.

The amount of metals, particularly Pt, Pd, Au, or Ag, in the sensing layer 4 is preferably small in terms of easiness of reducing raw material costs. Specifically, the amount of Pt, Pd, Au, or Ag in the sensing layer 4 may be 5 mass % or less.

Hereinafter, the structure of the metal oxide semiconductor gas sensor 10 according to the present embodiment and a method of manufacturing the same will be explained in more detail.

FIG. 1 shows the metal oxide semiconductor gas sensor 10 according to the present embodiment before the sensing layer 4 (NO sensing layer) is formed. The first electrode 2 and the second electrode 3 are formed on the substrate 1.

The substrate 1 may be any substrate. For example, the substrate 1 may be a substrate made from a heat resistant insulator against temperatures at which the metal oxide semiconductor gas sensor 10 operates. Specifically, an insulating ceramic substrate, a substrate with a thermal oxide film, or the like can be used as the substrate 1. Examples of the insulating ceramic substrate include an alumina substrate and a zirconia substrate. Examples of the substrate with a thermal oxide film include a silicon substrate with a thermal oxide film.

The substrate 1 is not an essential constituent of the metal oxide semiconductor gas sensor 10. It is only required that the metal oxide semiconductor gas sensor 10 include the first electrode 2, the second electrode 3, and the sensing layer 4 in contact with both the first electrode 2 and the second electrode 3, in a way that enables the metal oxide semiconductor gas sensor 10 to function as a gas sensor.

The first electrode 2 and the second electrode 3 may be made from any material that enables the first electrode 2 and the second electrode 3 to be conductive. For example, Pt or Au may be used as the material of the first electrode 2 and the second electrode 3.

The first electrode 2 and the second electrode 3 may have any shape. For example, the first electrode 2 and the second electrode 3 may have an interdigitated shape as shown in FIG. 1 so as to increase the area in contact with the sensing layer 4. This is preferable because the area where the first electrode 2 and the second electrode 3 are in contact with the sensing layer 4 is readily increased. It is preferable for the first electrode 2 and the second electrode 3 to be disposed so as to face each other as shown in FIG. 1. Note that the distance between the first electrode 2 and the second electrode 3 may be any distance. In terms of reducing the size of the metal oxide semiconductor gas sensor 10, the distance between the first electrode 2 and the second electrode 3 is preferably small. For example, the distance may be 50 µm or less.

The first electrode 2 and the second electrode 3 may be formed by any method. For example, the electrodes can be formed by a sputtering method, a vacuum deposition method, or a screen printing method.

Figure 2:
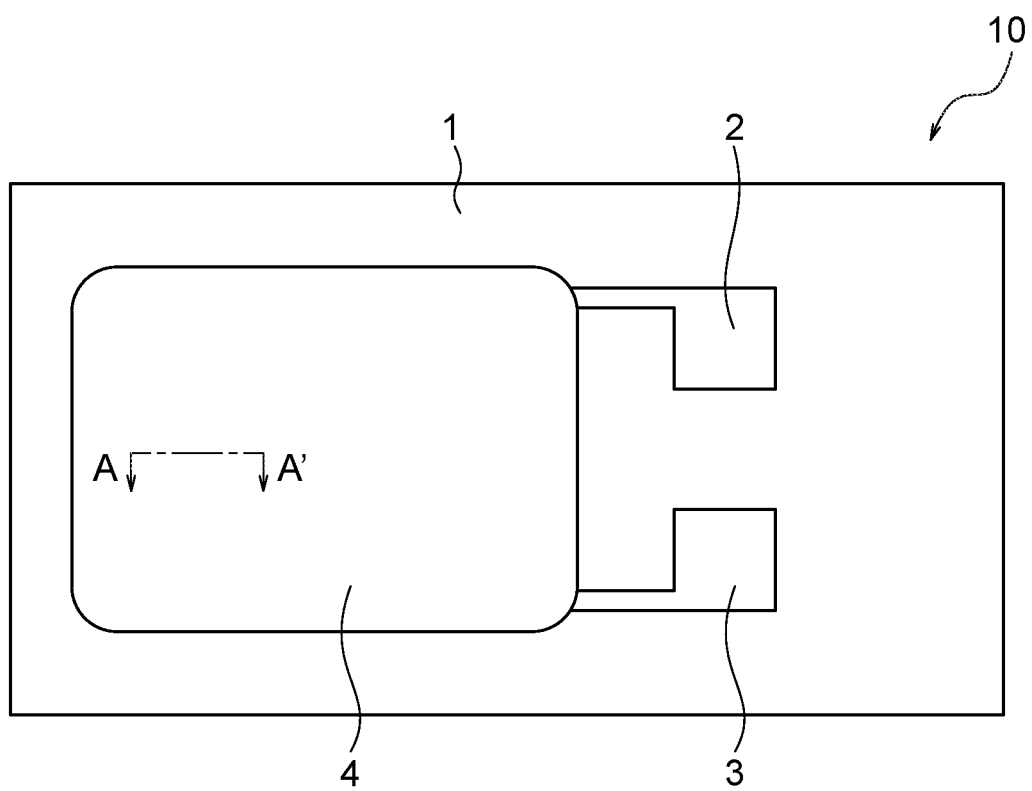
FIG. 2 is a diagram of the metal oxide semiconductor gas sensor according to the embodiment of the present invention.

After the first electrode 2 and the second electrode 3 are formed, the sensing layer 4 may be formed on the first electrode 2 and the second electrode 3 as shown in FIG. 2. The sensing layer 4 may have any shape, size, and the like. It is only required that the sensing layer 4 be in contact with both the first electrode 2 and the second electrode 3. For example, the sensing layer 4 may be formed so as to cover the first electrode 2 and the second electrode 3 as shown in FIG. 2.

Figure 3:
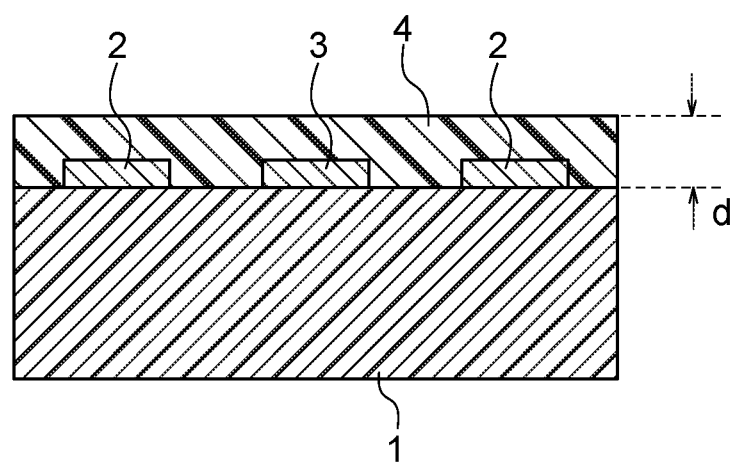
FIG. 3 is a cross-sectional view along line A-A' of FIG. 2.

FIG. 3 is a cross-sectional view along line A-A' of FIG. 2. As shown in FIG. 3, the sensing layer 4 may be formed on the first electrode 2 and the second electrode 3 so as to fill the spaces between the first electrode 2 and the second electrode 3 in order to ensure that the area in contact with the first electrode 2 and the second electrode 3 is sufficient.

The sensing layer 4 may have any thickness. For example, the thickness may be 1.0 µm or more. A thickness of 1.0 µm or more allows the metal oxide semiconductor gas sensor to be readily and highly sensitive to NO. The thickness of the sensing layer 4 does not have an upper limit. For example, the upper limit may be 20 um or less. Note that, when the first electrode 2 and the second electrode 3 are embedded in the sensing layer 4 as shown in FIG. 3, the thickness of the sensing layer 4 is the thickness at a part where the first electrode 2 and the second electrode 3 are not included. Specifically, a thickness d in FIG. 3 is the thickness of the sensing layer 4.

The sensing layer 4 may be formed by any method. For example, the sensing layer 4 can be formed by forming a paste including $SnO_2$, $WO_3$, a binder, and so on, applying the paste on the substrate 1 having the first electrode 2 and the second electrode 3, and firing the paste. The binder and so on in the paste may vaporize at the time of firing so that the sensing layer 4 includes $SnO_2$ and $WO_3$. Note that, heating $SnO_2$ and $WO_3$ at 600° C. or higher during firing causes rapid particle growth and accelerates necking of particles. Rapid particle growth and necking of particles reduce the specific surface area necessary for a gas to adsorb onto the sensing layer 4. Thus, the firing temperature may specifically be 350° C. to 550° C. The higher the firing temperature, the smaller the value of $\varphi_f-\varphi_n$ tends to be.

The paste for forming the sensing layer 4 may be formed by any method. For example, the paste can be formed by mixing $SnO_2$ and $WO_3$ with a vehicle made from the binder and an organic solvent or so and agitating the mixture. Examples of the binder include a binder made from a polymer compound (e.g., cellulose, ethyl cellulose, and hydroxyethyl cellulose). Examples of the organic solvent include toluene, xylene, terpineol, and ethylene glycol. The larger the proportion of the binder, the higher the porosity of the sensing layer 4 tends to be in the end. The longer the mixing and agitating time, the smaller the average pore size tends to be.

For having the predetermined sensing layer 4, the metal oxide semiconductor gas sensor 10 of the present embodiment can have enhanced sensitivity to NO and enhanced responsivity. Specifically, with high responsivity, the metal oxide semiconductor gas sensor 10 of the present embodiment can detect NO at a concentration of 1 ppm or less in a gas of interest. There is no lower limit of the detectable concentration of NO. For example, NO at a concentration of about 50 ppb or more can be detected.

Exposing the sensing layer 4, which is a semiconductor, to a NO-containing gas of interest changes the sensor resistance value or the value of resistance between the first electrode 2 and the second electrode 3. NO can be detected from the change of the sensor resistance value.

Hereinafter, principles by which the sensor resistance value changes will be explained. For many metal oxide semiconductor gas sensors, a sensor resistance value at the time of exposure to air is used as a criterion. During exposure to air, electron-withdrawing oxygen is adsorbed onto the surface of the semiconductor (sensing layer) of the respective metal oxide semiconductor gas sensors. When the semiconductor is an N-type semiconductor, adsorption of oxygen onto the surface of the semiconductor forms a space-charge layer in the vicinity of the surface of the semiconductor. Formation of the space-charge layer forms a potential barrier between semiconductor particles and prevents electrons from moving between the semiconductor particles.

When an oxidizing gas flows into the surface of the semiconductor while oxygen is adsorbed onto the surface, the space-charge layer thickens, resulting in the increase of the sensor resistance value. When a reducing gas flows into the surface of the semiconductor while oxygen is adsorbed onto the surface, the adsorbed oxygen is consumed and the space-charge layer thins, resulting in the reduction of the sensor resistance value. These principles enable the concentration of the gas of interest to be detected from the change of the sensor resistance value.

When the semiconductor is a P-type semiconductor, a reaction contrary to the reaction for an N-type semiconductor occurs. When an oxidizing gas flows into the surface of the semiconductor, the sensor resistance value decreases. When a reducing gas flows into the surface of the semiconductor, the sensor resistance value increases.

$R_g/R_a$ or $R_a/R_g$ represents the sensitivity to NO at a certain concentration, where $R_a$ is the sensor resistance value at the time when the metal oxide semiconductor gas sensor 10 is exposed to air that does not contain NO, and $R_g$ is the sensor resistance value at the time when the metal oxide semiconductor gas sensor 10 is exposed to a gas of interest having the certain concentration of NO. Either $R_g/R_a$ or $R_a/R_g$ having a value of 1 or more is the sensitivity. The sensitivity changes in accordance with the concentration of NO.

$R_a > R_g$ is mostly satisfied when the metal oxide semiconductor gas sensor 10 including the sensing layer 4 according to the present embodiment is exposed to NO.

A certain amount of time is needed for the sensor resistance value to change correspondingly after a gas being supplied to the metal oxide semiconductor gas sensor 10 is switched to another. Thus, in measurement of $R_a$, the sensor resistance value is continuously measured after supply of the air to the metal oxide semiconductor gas sensor 10 has started to confirm stability of the sensor resistance value. The stabilized sensor resistance value is $R_a$. In measurement of $R_g$, the sensor resistance value is continuously measured after supply of the gas of interest to the metal oxide semiconductor gas sensor 10 has started to confirm stability of the sensor resistance value. The stabilized sensor resistance value is $R_g$.

Provided that the absolute value $|(R_a-R_g)|$ of the amount of change of the sensor resistance value from $R_a$ (the sensor resistance value for the air) to $R_g$ (the sensor resistance value for the gas of interest) is 100, the time necessary for the absolute value to be 90 after a gas being supplied to the metal oxide semiconductor gas sensor 10 is switched from the air to the gas of interest is defined as a 90% response time ($T_{90}$). Provided that R denotes the sensor resistance value at the time when the 90% response time has passed, R is represented by $R=\{(R_a-R_g)\times 0.1+R_g\}$ (formula 1). In other words, $T_{90}$ is the time required for the sensor resistance value to change from $R_a$ to R.

When a graph is to be plotted with time on the horizontal axis and the sensor resistance value on the vertical axis using a logarithmic scale because the difference between $R_a$ and $R_g$ is large, provided that R' denotes the sensor resistance value at the time when the 90% response time has passed, R' may be represented by $\log R'=\{(\log R_a-\log R_g)\times 0.1+\log R_g\}$ (formula 2). In this case, $T_{90}$ is the time required for the sensor resistance value to change from $R_a$ to R'.

When the metal oxide semiconductor gas sensor 10 is exposed to the NO-containing gas of interest and then to the air that does not contain NO again, the sensor resistance value changes from $R_g$ to $R_a$ again. The time required for the sensor resistance value to change from $R_g$ to $R_a$ is preferably short. If the sensor resistance value for the NO-containing gas of interest is measured while the sensor resistance value for the air does not stabilize and continues to increase or decrease, the sensor resistance value for the NO-containing gas of interest may be larger or smaller than its proper value.

Thus, in the case of $R_a > R_g$, after the metal oxide semiconductor gas sensor 10 of the present embodiment is exposed to the NO-containing gas of interest and then to the air that does not contain NO again, the sensor resistance value preferably changes to a value that is 80% or more and 100% or less of $R_a$ (the sensor resistance value before exposure to the gas of interest) within five minutes. In the case of $R_a < R_g$, after the metal oxide semiconductor gas sensor 10 of the present embodiment is exposed to the NO-containing gas of interest and then to the air that does not contain NO again, the sensor resistance value preferably changes to a value that is 100% or more and 120% or less of $R_a$ (the sensor resistance value before exposure to the gas of interest) within five minutes.

The metal oxide semiconductor gas sensor 10 of the present embodiment may operate at any temperature. For example, the metal oxide semiconductor gas sensor 10 preferably operates at 150° C. or higher and 400° C. or lower, because heating to a temperature of 150° C. or higher can increase responsivity to NO (the gas of interest). Heating to a high temperature over 400° C. may cause particle growth of $SnO_2$ particles and/or $WO_3$ particles, possibly degrading the metal oxide semiconductor gas sensor 10. To prevent particle growth and degradation of the metal oxide semiconductor gas sensor 10 and enable its long-term use, the operating temperature is preferably 400° C. or lower as stated above.

The operating temperature of the metal oxide semiconductor gas sensor 10 may be held within the above-mentioned range by any method. Any of various heating methods, such as external heating with an electric furnace or the like and resistance heating through formation of a heater (e.g., a Pt heater) on the backside or the like of the substrate and application of electricity to the heater, can be selected.

According to the metal oxide semiconductor gas sensor of the present embodiment that has been explained above, NO contained at a concentration of about 1 ppm in the gas of interest can be detected at low cost.

Any NO-containing gas can be measured. In particular, NO in a combustion engine exhaust gas can be suitably measured.

Because the metal oxide semiconductor gas sensor of the present embodiment can detect NO contained at a concentration of about 1 ppm at low cost, the metal oxide semiconductor gas sensor can be particularly suitable for, for example, home healthcare applications.

EXAMPLES

Hereinafter, the present invention will be explained in detail using examples, but the present invention is not limited to the examples.

Examples 1 to 2 and Comparative Examples 1 to 4

A metal oxide semiconductor gas sensor 10 shown in FIGS. 1 to 3 was manufactured and evaluated in accordance with the following procedure.

ED-IDE3-Au, manufactured by MicruX Technologies, sized into 9.5×5.0 mm² was prepared as a substrate 1.

On the substrate 1, a first electrode 2 and a second electrode 3 having an interdigitated shape as shown in FIG. 1 were formed. Specifically. Pt electrodes having a size of 2.5×4.0 mm², a width of 15 μm, a distance of 15 μm therebetween, and an interdigitated shape were formed by a sputtering method.

On the electrodes 2 and 3, a paste including a powder having a composition shown in Table 1 was applied. An inkjet printer was used to apply the paste. Firing was performed at a firing temperature of 450° C. in air using a firing furnace to form a sensing layer 4 on the electrodes 2 and 3 as shown in FIG. 2, completing manufacture of the metal oxide semiconductor gas sensor 10.

A method of preparing the paste including the powder having a composition shown in Table 1 will be explained below.

A $SnO_2$ powder (US Research Nanomaterials, Inc.; average particle size: 35 to 55 nm) and a $WO_3$ powder (US Research Nanomaterials, Inc.; average particle size: 23 to 65 nm) were mixed so as to satisfy a composition shown in Table 1 to give a mixed powder. Separately, a polyvinyl butyral resin (BM-S manufactured by SEKISUI CHEMICAL CO., LTD.) and BDG (diethylene glycol monobutyl ether) were mixed to give a binder. The mixed powder and the binder were weighed at a mass ratio of 1:3 and were mixed and agitated with a room-temperature pulverizer (mixer mill) manufactured by SPEX for one hour to give the paste.

A method of evaluating the metal oxide semiconductor gas sensor will be explained next.

The metal oxide semiconductor gas sensor was placed in a sample chamber having a heater. The sample holder having the heater was heated to 150° C. to 400° C.

Nitrogen and oxygen were mixed at a flow rate ratio of 4:1 to produce synthetic air. Synthetic air was introduced into the sample chamber at 500 mL/min to measure the sensor resistance value.

The sensor resistance value was measured by a two-terminal method using a 2700 multichannel digital multimeter (DMM) manufactured by Keithley Instruments, Inc. The interval between measurement times of the sensor resistance value was 10 seconds. After stability of the sensor resistance value was confirmed, the sensor resistance value was measured at an interval of 10 seconds and averaged over 200 seconds. The average value was regarded as the sensor resistance value ($R_a$) for synthetic air.

After measurement of $R_a$, a certain amount of nitric oxide (NO) was introduced into nitrogen from a standard NO gas cylinder (base gas is a $N_2$ gas) to produce a NO-containing nitrogen gas. This NO-containing nitrogen gas and oxygen were mixed at a flow rate ratio of 4:1 to produce a NO-containing gas. This NO-containing gas had a NO concentration of 1 ppm. The NO-containing gas was introduced into the sample chamber at 500 mL/min to supply the gas to the metal oxide semiconductor gas sensor. Change in the sensor resistance value caused by the supply of the NO-containing gas was examined. The sensor resistance value measured after 15 minutes had passed since the NO-containing gas started to be supplied was regarded as $R_g$. Further, $R_a/R_g$ or $R_g/R_a$ was calculated as the sensitivity. Table 1 shows the results. A $R_a/R_g$ or $R_g/R_a$ value of 2.40 or more was regarded as good, and a $R_a/R_g$ or $R_g/R_a$ value of 2.60 or more was regarded as better. Note that, in all Examples and Comparative Examples (described later), $R_a > R_g$ was satisfied.

A 90% response time ($T_{90}$) was identified as explained above. The time from when supply of the NO-containing gas started to when the sensor resistance value reached R' shown in formula 2 above was regarded as $T_{90}$. A $T_{90}$ value of 120 seconds or less was regarded as good, and a $T_{90}$ value of 100 seconds or less was regarded as better.

A backscattered electron image, taken with a scanning electron microscope (SU5000 manufactured by Hitachi, Ltd.), of a cross section of the sensing layer 4 parallel to its thickness direction was processed to calculate the average porosity of the cross section of the sensing layer 4. Further, the average pore size at the cross section of the sensing layer 4 was calculated. The backscattered electron image had a size that allowed the sensing layer 4 to be entirely observed in its thickness direction. The backscattered electron image was taken where the first and second electrodes would not be included in the image.

Further, the backscattered electron image was divided into three substantially equal regions in the thickness direction of the sensing layer 4. A region closest to the first and second electrodes in the backscattered electron image was processed to calculate the region's average porosity, which was defined as $\varphi_n(\%)$. A region farthest from the first and second electrodes in the backscattered electron image was processed to calculate the region's average porosity, which was defined as $\varphi_f(\%)$. A value of $\varphi_f$-$\varphi_n$ was calculated. Table 1 shows the results.

Using LA-ICP-MS, it was confirmed that the composition of the sensing layer 4 provided that pores were not counted as part of the sensing layer 4 (the composition of the metal oxide material in the sensing layer 4) had values shown in Table 1.

Examples 5 to 7

Two different pastes with different proportions of the binder were prepared. The paste with a smaller proportion of the binder was applied first, and then the other paste with a larger proportion of the binder was applied, so that the value of $\varphi_f$-$\varphi_n$ would be as shown in Table 1 in the end. Other conditions were the same as in Example 1. Table 1 shows the results.

Even when the value of $\varphi_f$-$\varphi_n$ was changed, each Example whose sensing layer 4 had a composition and an average porosity within the predetermined ranges had good

TABLE 1

| Sample No. | Composition [vol %] SnO$_2$ | Composition [vol %] WO$_3$ | Average porosity of sensing layer | Difference in porosity $\varphi_f - \varphi_n$ | Average pore size [nm] | Sensing layer thickness [um] | Sensitivity $R_a/R_{g\ OR}\ R_g/R_a$ | Response time $T_{90}$ [sec] |
|---|---|---|---|---|---|---|---|---|
| Comparative Example 1 | 100 | 0 | 16.4% | 1.6 | 72 | 1.2 | 2.13 | 125 |
| Comparative Example 2 | 90 | 10 | 16.5% | 1.8 | 71 | 1.2 | 2.49 | 121 |
| Example 1 | 80 | 20 | 16.5% | 1.3 | 70 | 1.2 | 3.20 | 90 |
| Example 2 | 60 | 40 | 16.2% | 1.5 | 71 | 1.2 | 3.02 | 92 |
| Comparative Example 3 | 50 | 50 | 16.3% | 1.7 | 71 | 1.2 | 1.77 | 128 |
| Comparative Example 4 | 0 | 100 | 16.4% | 1.5 | 74 | 1.2 | 1.20 | 135 |
| Comparative Example 5 | 80 | 20 | 15.7% | 0.7 | 66 | 1.2 | 1.97 | 162 |
| Example 1 | 80 | 20 | 16.5% | 1.3 | 70 | 1.2 | 3.20 | 90 |
| Example 3 | 80 | 20 | 17.1% | 1.3 | 72 | 1.2 | 4.20 | 87 |
| Example 4 | 80 | 20 | 21.0% | 1.8 | 75 | 1.2 | 5.58 | 85 |
| Comparative Example 6 | 80 | 20 | 25.2% | 2.0 | 79 | 1.2 | Unmeasurable | |
| Example 5 | 80 | 20 | 17.3% | 4.1 | 71 | 1.2 | 4.30 | 89 |
| Example 6 | 80 | 20 | 18.2% | 3.7 | 72 | 1.2 | 4.75 | 88 |
| Example 7 | 80 | 20 | 20.9% | 1.4 | 75 | 1.2 | 5.47 | 87 |
| Example 3 | 80 | 20 | 17.1% | 1.3 | 72 | 1.2 | 4.20 | 87 |
| Example 8 | 80 | 20 | 16.6% | 0.5 | 71 | 1.2 | 3.05 | 105 |
| Example 9 | 80 | 20 | 16.1% | 0.3 | 71 | 1.2 | 3.01 | 115 |
| Example 10 | 80 | 20 | 17.0% | 1.2 | 42 | 1.2 | 2.56 | 89 |
| Example 3 | 80 | 20 | 17.1% | 1.3 | 72 | 1.2 | 4.20 | 87 |
| Example 11 | 80 | 20 | 16.1% | 1.5 | 140 | 1.2 | 2.97 | 85 |
| Example 12 | 80 | 20 | 17.3% | 1.4 | 160 | 1.2 | 2.40 | 89 |
| Example 13 | 80 | 20 | 17.1% | 1.0 | 71 | 0.4 | 2.51 | 100 |
| Example 1 | 80 | 20 | 16.5% | 1.3 | 70 | 1.2 | 3.20 | 90 |
| Example 14 | 80 | 20 | 16.6% | 1.5 | 73 | 1.6 | 3.73 | 92 |
| Example 15 | 80 | 20 | 16.1% | 1.1 | 73 | 5.4 | 6.80 | 92 |

According to Table 1, Examples 1 and 2 whose sensing layer 4 had a composition satisfying predetermined ranges had good sensitivity and good responsivity. In contrast, Comparative Examples 1 to 4 whose sensing layer 4 had a composition that did not satisfy the predetermined ranges did not have good sensitivity and/or good responsivity.

Examples 3 to 4, Comparative Examples 5 to 6

A metal oxide semiconductor gas sensor was manufactured as in Example 1, except that the proportion of the binder was changed from Example 1 to change the average porosity of the sensing layer 4 to a value shown in Table 1 accordingly. The smaller the proportion of the binder, the lower the average porosity. Table 1 shows the results.

Examples 3 to 4 having an average porosity of 16.0% or more and 22.0% or less of the sensing layer 4 had good sensitivity and good responsivity. In contrast, Comparative Example 5 having too low an average porosity did not have good sensitivity or good responsivity. Comparative Example 6 having too high an average porosity had too low a shape retaining property of the sensing layer 4. Thus, the sensitivity and responsivity of Comparative Example 6 were unmeasurable.

sensitivity and good responsivity. Note that the average porosity of the sensing layer 4 affected the sensitivity and responsivity more than $\varphi_f$-$\varphi_n$ did. Thus, Examples 5 and 6 had lower sensitivity than Example 7 and about the same responsivity as Example 7.

Examples 8 to 9

A metal oxide semiconductor gas sensor was manufactured as in Example 3, except that the firing temperature during formation of the sensing layer 4 was increased so that the value of $\varphi_f$-$\varphi_n$ would be as shown in Table 1 in the end. Table 1 shows the results.

Even when the value of $\varphi_f$-$\varphi_n$ was changed, each Example whose sensing layer 4 had a composition and an average porosity within the predetermined ranges had good sensitivity and good responsivity. Note that, Example 3 with a $\varphi_f$-$\varphi_n$ value of 1.0 or more had higher sensitivity and better responsivity than Examples 8 and 9 with a $\varphi_f$-$\varphi_n$ value of less than 1.0.

Examples 10 to 12

A metal oxide semiconductor gas sensor was manufactured as in Example 3, except that the mixing and agitating time during preparation of the paste was changed so that the average pore size would be as shown in Table 1 in the end. The longer the mixing and agitating time, the smaller the average pore size. Table 1 shows the results.

Even when the average pore size was changed, each Example whose sensing layer 4 had a composition and an average porosity within the predetermined ranges had good sensitivity and good responsivity. Note that, Examples 3 and 11 with an average pore size of 70 nm or more and 150 nm or less had better sensitivity than Example 10 with an average pore size of less than 70 nm and Example 12 with an average pore size of over 150 nm.

Examples 13 to 15

A metal oxide semiconductor gas sensor was manufactured as in Example 1, except that the thickness of the sensing layer 4 was changed. Table 1 shows the results.

Even when the thickness of the sensing layer 4 was changed, each Example whose sensing layer 4 had a composition and an average porosity within the predetermined ranges had good sensitivity and good responsivity. Note that, Examples 1, 14, and 15 whose sensing layer 4 had a thickness of 1.0 μm or more had better sensitivity than Example 13 whose sensing layer 4 had a thickness of less than 1.0 μm.

NUMERICAL REFERENCES

1 . . . substrate
2 . . . first electrode
3 . . . second electrode
4 . . . sensing layer
10 . . . metal oxide semiconductor gas sensor

What is claimed is:

1. A metal oxide semiconductor gas sensor comprising:
a first electrode;
a second electrode; and
a sensing layer in contact with the first electrode and the second electrode; wherein
the sensing layer includes $SnO_2$ and $WO_3$,
a cross section of the sensing layer has an average porosity of 16.0% or more and 22.0% or less, and
$SnO_2$ occupies 60 vol % or more and 80 vol % or less and $WO_3$ occupies 20 vol % or more and 40 vol % or less in the sensing layer provided that pores are not counted as part of the sensing layer.

2. The metal oxide semiconductor gas sensor according to claim 1, wherein $\varphi_f - \varphi_n \geq 1.0$ is satisfied, in which $\varphi_n$ (%) is the average porosity of a region of the sensing layer closest to the first electrode and the second electrode, and $\varphi_f$ (%) is the average porosity of a region of the sensing layer farthest from the first electrode and the second electrode, provided that the sensing layer is divided into three substantially equal regions in a thickness direction of the sensing layer.

3. The metal oxide semiconductor gas sensor according to claim 1, wherein a cross section of the sensing layer has an average pore size of 70 nm or more and 150 nm or less.

4. The metal oxide semiconductor gas sensor according to claim 1, wherein the sensing layer has a thickness of 1.0 μm or more.

* * * * *